United States Patent [19]

Fukushima et al.

[11] Patent Number: 4,731,632
[45] Date of Patent: Mar. 15, 1988

[54] TONER DEVELOPMENT DEVICE WITH IMPROVED SCRAPER

[75] Inventors: Masao Fukushima; Yoshihiko Bessho; Masao Nishikawa; Yasunari Yamaguchi, all of Shiga, Japan

[73] Assignee: Dainippon Screen Mfg. Co., Ltd., Kyoto, Japan

[21] Appl. No.: 861,255

[22] Filed: May 9, 1986

[30] Foreign Application Priority Data

May 10, 1985 [JP] Japan ............................ 60-69793[U]

[51] Int. Cl.⁴ .............................................. G03G 15/09
[52] U.S. Cl. ................................... 355/3 DD; 118/653
[58] Field of Search .................... 355/3 DD, 14 D; 222/DIG. 1; 118/653, 657–658

[56] References Cited

U.S. PATENT DOCUMENTS 4,044,719  8/1977  Ohmori ...................... 355/3 DD X
4,173,405  11/1979  Swapceinski et al. .......... 355/3 DD

FOREIGN PATENT DOCUMENTS 54-50340  4/1979  Japan .............................. 355/3 DD

*Primary Examiner*—Arthur T. Grimley
*Assistant Examiner*—J. Pendegrass
*Attorney, Agent, or Firm*—Lowe, Price, LeBlanc, Becker & Shur

[57] ABSTRACT

The present invention relates to a toner development device for an electrophotographic copying machine and aims to attain a reproduced image without uneven thickness by stirring developers composed of toner and carrier and feeding the developers mixed uniformly in the longitudinal direction along a photosensitive drum. An electrostatic latent image produced on the photosensitive drum is made to be visible in contact with the developers retained in a brushlike state by magnetic force of a magnet roller thereon. The developers, of which a part of the toner is spent, is scraped off by the primary scraper of a scraping means, which is arranged so as to contact slidingly with the magnet roller. To the primary scraper, the secondary scraper is fixed for its fixed position to be adjusted forwards and rearwards in order to distribute the toner uniformly in the toner development device. The developers scraped off can be returned more to somewhat insufficient portions and less to somewhat excessive portions in a stirring means composed of a plurality of screw rollers through the outer edge of the secondary scraper of which position adjusted accordingly.

4 Claims, 5 Drawing Figures

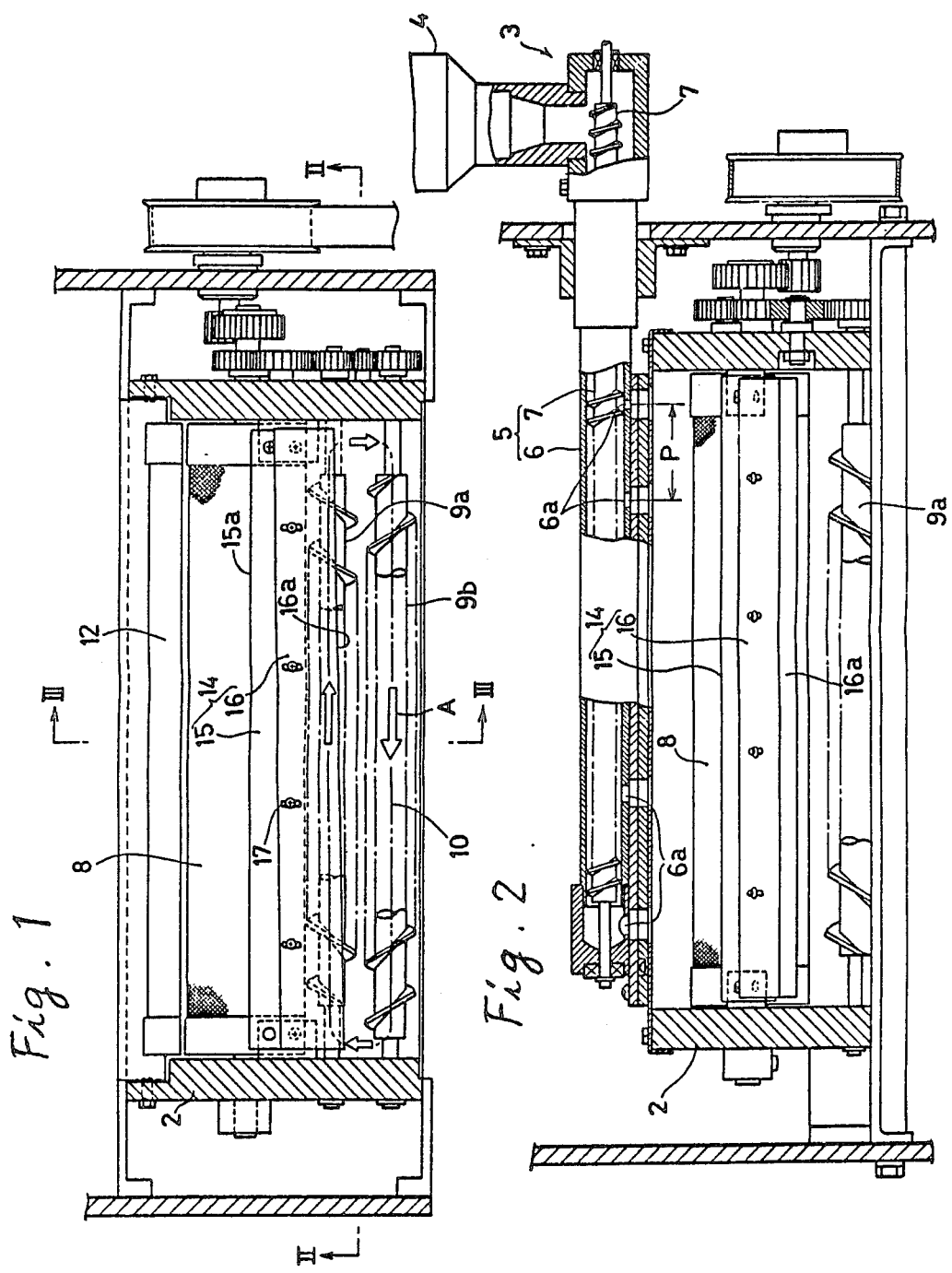

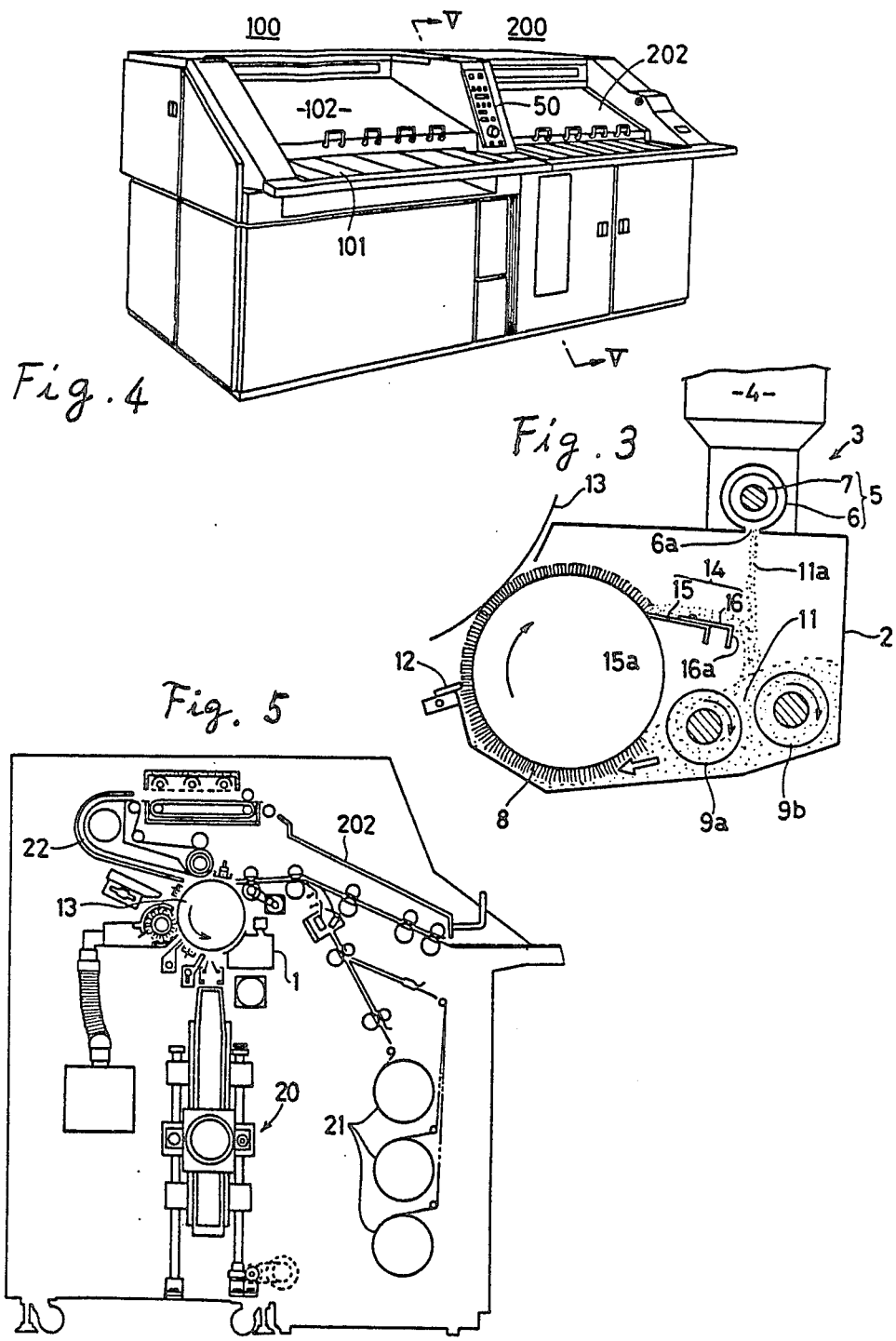

TONER DEVELOPMENT DEVICE WITH IMPROVED SCRAPER

BACKGROUND OF THE INVENTION

1. Field of the Invention

The present invention relates to a toner development device for an electrophotographic copying machine, which is able to dissolve an unevenness in development by stirring developers composed of two kinds of components.

2. Prior Art

It is known in the art that it is desirable for the toner development device of above mentioned type to make both toner and carrier charged frictionally by mixing them well and also to feed the developers uniformly to dissolve the unevenness in development in the longitudinal direction of its photosensitive drum. Such device has so far been disclosed, for example in Japanese Utility Model publications of No. 27333 of 1975 and No. 31301 of 1982.

When feeding the developers to its magnet roller from the circulative loop passage defined by two screw rollers, it is intended for the developers to be stirred uniformly, respectively by two screw rollers of which screw directions are opposite to each other in the former publication of No. 27333 of 1975 and by two screw rollers of which screw pitches are different to each other in the latter publication of No. 31301 of 1982.

However, the toner development device in the above-mentioned prior art is apt to generate the unevenness in development length-wise along its photosensitive drum, particularly it is not easy to adjust for the dissolution of the unevenness in a large-sized copying machine. That is, upon the generation of any unevenness in development, first it becomes necessary to adjust the toner feed capacity of each screw roller, consequently the rotation speed of each screw roller. Therefor, it is required to provide a power transmission such as a gear box between one driving unit and the screw rollers or to provide a fine adjustment mechanism which makes use of two driving units in order to adjust each rotation speed of two screw rollers individually. Hence, these add substantially to the cost and complexity of the copying machine.

Even though once such fine adjustment was done, it might become necessary to readjust due to any displacement of the copying machine, an uneven surface of its installation floor or any balancing with the toner feed quantity, etc. And since this copying machine of the electrophotographic type has such peculiarity as developers are apt to be put aside in the circulative loop passage over a long time in use, it becomes difficult to readjust it under above described complex arrangement.

OBJECTS AND SUMMARY OF THE INVENTION

The present invention is directed to solving the problems noted above, and has for its object to provide a toner development device for an electrophotographic copying machine, which is simple in construction and can be readily adjusted so as to dissolve an unevenness in development.

The means of the present invention for accomplishing the above purpose is a toner development device for an electrophotographic copying machine, in which a scraping means comprises a primary scraper and a secondary scraper for scraping residual developers on a magnet roller after developing treatment, and the secondary scraper can be attached adjustably with respect to the primary one.

Accordingly, after a latent image made to be visible on photosensitive material of the magnet roller, the residual developers carried on the magnet roller are scraped off by the scraping edge of the primary scraper and then returned to a circulative loop passage defined by means of plural screw rollers falling from the outer edge of the secondary scraper. Therefore, by adjusting the position of the outer edge of the secondary scraper, the developers scraped out of the magnet roller can be returned more to somewhat insufficient portions and less to somewhat excessive portions in the cirulative loop passage for the developers to be stirred well and prevented from being distributed unevenly in the passage.

Consequently, the power transmission composed of complex adjusting mechanism for the screw roller is unnecessary owing to the scraping means with above described functions.

The foregoing and other objects and attendant advantages of the present invention will be readily appreciated as the same become better understood by reference to the following detailed description when considered by the accompaning drawings, wherein:

BRIEF DESCRIPTION OF THE DRAWINGS

FIG. 1 is a schematic plan view showing the principal part of a preferred embodiment of a toner development device of the present invention;

FIG. 2 is an elevational view on line II—II in FIG. 1

FIG. 3 is a sectional side view on line III—III in FIG. 1;

FIG. 4 is a perspective view of an electrophotographic copying machine according to the present invention; and FIG. 5 is a sectional side view on line V—V in FIG. 4.

DESCRIPTION OF THE PREFERED EMBODIMENT

As shown in FIG. 4, a comparatively large-sized electrophotographic copying machine comprises an operation panel 50 at the center of its front side, an original feeding and scanning equipment 100 at its left side and a reproduced image recording equipment 200 at its right side. In the original feeding and scanning equipment, when an original, of which image facing onto an original setter 101 is fed into the equipment, it is returned to an original receptacle 102 through its predetermined pathway being illuminated therein.

While the original being fed through the pathway, the image of the original is exposed on a photosensitive drum 13 through an optical system 20 so that it may produce the corresponding electrostatic latent image thereon, which is made visible by the toner development device 1 in the recording equipment 200. Then the visible toner image is transferred on a sheet of recording paper 21, which is thereafter fed out to a copy receptacle 202 through a predetermined pathway 22 for the sheet.

In FIGS. 1, 2 and 3, the numeral 2 is developing box; 3 is a toner supplying device; 8 is a magnet roller for developing treatment; 9a and 9b are screw rollers; 11 is developer; and 14 is a scraping means.

The toner supplying device 3 for spent toner comprises a hopper 4 which contains toner 11a therein and a toner distributor 5 which feeds toner 11a widthwise (in the longitudinal direction) within the developing box 2. The hopper 4 is disposed at the one side of the toner distributor 5 and supplies the toner 11a thereto. The toner distributor 5 comprises a cylinder 6 and a screw roller 7 therein, and is disposed in the longitudinal direction within the developing box 2 so as to feed the toner 11a into a circulative loop passage 10 for developers 11 as described in detail later, through supply openings 6a bored at the underside of the cylinder 6. These openings 6a are bored, as shown in FIG. 2, in larger diameter individually according as their positions go away from the hopper 4 and in a predetermined pitch, for example pitch 50 mm so as to distribute the toner 11a about uniformly in the longitudinal direction of the developing box 2.

One magnet roller 8 and two screw rollers 9a and 9b are disposed in parallel in the longitudinal direction, that is widthwise, within the box 2. These two screw rollers 9a and 9b define the circulative loop passage 10 and as indicated by the arrow A in FIG. 1, feed the developers 11 composed of toner 11a and carrier 11b to the magnet roller 8 stirring toner and carrier mixedly well. The developers are attracted and retained in a brushlike state by the magnet roller 8 thereon. The head portions of the developers retained in the brushlike state are trimmed off by a regurating plate 12 and contact with the photosensitive drum to make the electrostatic latent image visible thereon with being attracted by the image.

The developers, of which a part of toner 11a is spent, are scraped and returned into the circulative loop passage 10 by the scraping means 14. The scraping means 14 comprises the primary scraper 15 which is arranged in a suitable angle of inclination relative to the surface of the magnet roller 8 and in contact therewith slidingly through its scraping edge 15a in order to scrape residual developers as yet attracted and retained on the magnet roller, and the secondary scraper 16 which is fixed adjustably to the primary scraper 15 in order to guide the developers scraped off to be returned into the passage 10 from the outer edge 16a. The secondary scraper 16 is provided with elongated holes 17 for use in its fixation and positioning the outer edge 16a adjustably forwards and rearwards relative to the screw rollers 9a and 9b. In this embodiment shown in FIG. 1, the outer edge 16a of the secondary scraper 16 is positioned in its left side brought more forwards relative to its right side in order to prevent the developers 11 from being fed unevenly and to attain the uniform distribution of the toner 11a widthwise.

In the illustrated embodiment, the secondary scraper 16 is composed of one piece of member. However, it may be composed of a plurality of members segmented widthwise of the developing box 2. In this case, the other secondary scraper is preferably used for the circulative loop passage which is shaped generally in the numeral of "8", and can be adjusted more readily and more strictly in the relative position to each screw roller to distribute toner more uniformly and more effectively widthwise.

From the foregoing description, the followings will be evident to those skilled in the art.

(a) Since the uneven distribution of the developers, which is caused eventually in the circulative loop passage due to any unbalanced toner feeding capacity among a plurality of screw rollers, can be dissolved by adjusting the position of the outer edge of the secondary scraper relative to the screw roller, it is not necessary for the toner development device to be equipped with a special mechanism for adjusting each toner feed capacity of screw rollers. It is a great advantageous feature of the present invention.

(b) Especially, in case that the secondary scraper is segmented to a plurality of members each of which can be positioned adjustably relative to the screw roller, the adjustment can be done more strictly and advantageously to distribute the toner more uniformly widthwise.

We claim:

1. A toner development device for an electrophotograhic copying machine comprising a toner supplying device mounted detachably to a developing box, a plurality of screw rollers arranged parallel so as to define a circulative passage for developers in said developing box, a magnet roller arranged adjacent to said screw rollers, a regulating device for regulating a supplied and retained quantity of developers supplied to said magnet roller and a scraping means for scraping off the developers retained on said magnet roller and returning them to said circulative passage,
wherein said scraping means is composed of a primary scraper and a secondary scraper, and said secondary scraper is fixedly adjustable forward and rearward relative to said primary scraper.

2. A toner development device according to claim 1, wherein the toner supplying device comprises a toner distributor disposed horizontally in the longitudinal direction along the upper side of the developing box and a hopper disposed at the one side of the toner distributor, said toner distributor comprising a cylinder having toner supply openings bored at the underside thereof and a screw roller disposed therein and distributing the toner from the hopper into the developing box over lengthwise so as to supply the toner.

3. A toner development device according to claim 1, wherein said toner supply openings are bored in larger diameter individually according as their positions go away from the hopper and in a predetermined pitch.

4. A toner development device for an electrophotographic copying machine comprising a toner supplying device mounted detachably to a developing box, a plurality of screw rollers arranged parallel so as to define a circulative passage for developers in said developing box, a magnet roller arranged adjacent to said screw rollers, a regulating device for reguiting a supplied and retained quantity of developers supplied to said magnet roller and a scraping means for scraping off the developers retained on said magnet roller and returning them to said circulative passage,
wherein said scraping means is composed of a primary scraper and a secondary scraper, and said secondary scraper is segmented to a plurality of members lengthwise thereof and is adjustable forward and rearward relative to said primary scraper.

* * * * *